United States Patent
Fukuhara et al.

(10) Patent No.: US 7,072,519 B2
(45) Date of Patent: Jul. 4, 2006

(54) IMAGE CODING DEVICE AND METHOD THEREOF AND IMAGE DECODING DEVICE AND METHOD THEREOF

(75) Inventors: Takahiro Fukuhara, Kanagawa (JP); Seiji Kimura, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/211,643

(22) Filed: Aug. 26, 2005

(65) Prior Publication Data
US 2006/0034526 A1 Feb. 16, 2006

Related U.S. Application Data

(62) Division of application No. 09/919,925, filed on Aug. 2, 2001, now Pat. No. 6,990,245.

(30) Foreign Application Priority Data
Aug. 8, 2000 (JP) ............................ P2000-240464

(51) Int. Cl.
*G06K 9/36* (2006.01)
(52) U.S. Cl. ........................ 382/240; 382/233; 382/232
(58) Field of Classification Search ............... 382/232, 382/233, 240, 244–248; 358/539; 375/240.19; 348/398.1, 408.1
See application file for complete search history.

(56) References Cited

U.S. PATENT DOCUMENTS
6,067,383 A 5/2000 Taniguchi et al.

*Primary Examiner*—Duy M. Dang
(74) *Attorney, Agent, or Firm*—Rader, Fishman & Grauer PLLC; Ronald P. Kananen

(57) ABSTRACT

A predetermined area of input image data (100) is read and stored into a memory section (1). As soon as data is stored in the data read memory section (1), wavelet conversion filtering is performed on the image area, in the horizontal or vertical direction, by a wavelet conversion section (5). The wavelet conversion section (5) comprises a fixed-point type wavelet conversion section (3) and an integer type wavelet conversion section (4). Data from the data read memory section (1) is switched and controlled by a switching section (2), and supplied to either the fixed-point wavelet conversion section (3) or the integer type wavelet conversion section (4).

2 Claims, 14 Drawing Sheets

| Value (bits) MSB   LSB | Transform type |
|---|---|
| 0000 0000 | 9-7 irreversible wavelet transform |
| 0000 0001 | 5-3 reversible wavelet transform |
| 0000 0010 | 5-3 irreversible wavelet transform |
|  | All other values reserved. |

FIG.16

IMAGE CODING DEVICE AND METHOD THEREOF AND IMAGE DECODING DEVICE AND METHOD THEREOF

This application is a divisional application of and claims priority from U.S. application Ser. No. 09/919,925, filed Aug. 2, 2001, now U.S. Pat. No. 6,990,245, which claims priority from Japanese Application No. P2000-240464, filed on Aug. 8, 2000, the entire contents of which are hereby incorporated by reference.

BACKGROUND OF THE INVENTION

1. Field of the Invention

The present invention relates to an image coding apparatus and a method thereof and an image decoding apparatus and a method thereof, which use wavelet conversion to encode a still image or a motion picture.

2. Description of the Related Art

A conventional representative image compression method is a JPEG (Joint Photographic Coding Experts Group) system standardized by ISO (International Organization for Standardization). In this JPEG system, DCT (Discrete Cosine Transform) is used to compress and encode mainly still images. It is known that this system provides excellent coded/decoded images if a relatively high bit number is assigned. In this system, however, block deformation specific to DCT becomes conspicuous so that deterioration subjectively becomes conspicuous.

Differently from the above system, studies have recently been made of a system in which an image is divided into a plurality of band ranges called filter banks by a filter which combines a high-pass filter and a low pass filter, and coding is carried out for every band range. Particularly, wavelet coding is strongly regarded as a new technique which will substitute the existing DCT technique because the wavelet coding excludes the drawback of the DCT technique, i.e., block deformation becomes conspicuous under high compression.

Meanwhile, MPEG (Motion Picture Experts Group) system is used for motion picture coding. MPEG-1, MPEG-2, and MPEG-4 are known at present. Particularly, the MPEG-2 is widely used for video compression and the like for DVD (Digital Versatile Disc). In a coding means for the JPEG and MPEG systems, coding control is performed for every macro block (normal: 16×16) constructed by 8×8 blocks as processing units of the DCT.

Presently, many products such as electronic still cameras, video movies, and the like adopt the JPEG system, the MPEG system, or so-called DV (Digital Video) system. Each of these compression coding systems adopts DCT for its conversion system. It is supposed that products as described above, which are based on wavelet conversion, will appear on the market in the future. Discussions for improvements in the efficiency of the coding system are eagerly carried out by research organizations. Actually, JPEG 2000 (being prepared by ISO/IEC/JTC1SC29/WG1 which is the same organization as JPEG), which is expected to be the international standard system for still images and which can be said to be a follower in the next generation, is a format from which a standardization recommendation Part-1 is to be issued in December 2000. According to the JPEG 2000, it has been decided to adopt wavelet conversion in place of existing DCT of the JPEG, as a conversion system as the basis of image compression.

In order to obtain coded images with high quality with respect to not only still images but also motion pictures by means of the wavelet conversion, it is important to solve problems as will be described below.

(1) At FCD (Final Committee Draft) concerning Part-1 of JPEG-2000, there are two filters for wavelet conversion which is presently defined in July 2000. One is a 5×3 filter of an Integer type for reversible conversion, and another filter is a 7×9 filter of a Float type for irreversible conversion.

(2) Compared with the Integer type 5×3 filter, the Float type 7×9 filter has much higher structural complexity, so there is a problem in using filters of both types to construct hardware. In addition, in order to guarantee the precision of the floating point in the latter type, a dedicated floating point calculator is required, resulting in a problem that the circuit scale of the hardware must be enlarged.

(3) On the other side, as a result of experiments, a 5×3 filter of a fixed-point type which is obtained as a more precise version of the 5×3 filter of the Integer type described not only achieves a coding efficiency of excellent performance equivalent to that of the 7×9 filter of the Float type as described above but also has parts common to the 5×3 filter of the Integer type, in its internal calculators. Accordingly, there is an advantage in that enlargement of hardware can be reduced to the least by comprising both filters, without sacrificing the coding efficiency.

(4) FCD according to Part-1 of JPEG-2000 describes a calculation expression for the 5×3 filter of the Integer type as described above. In accordance with the procedure thereof, a wavelet conversion coefficient can be generated. However, the FCD includes no description about the calculation means of the 5×3 filter of a Fixed-point type. Settlement of compatibility between both filters relates to settlement of a common circuit as described above and is thus very important.

BRIEF SUMMARY OF THE INVENTION

The present invention has been proposed in view of the above situation and has an object of providing an image coding apparatus and a method thereof and an image decoding apparatus and a method thereof, which are capable of increasing the degree of freedom in selecting the image quality and compression rate, without enlarging the hardware structure in wavelet conversion.

To achieve the above object, in an image coding device and a method thereof according to the present invention, a predetermined area of input image data is read and stored into a memory, wavelet conversion filtering is performed on an image area in a horizontal or vertical direction as soon as data is stored in the memory means, and either fixed-point type wavelet conversion or integer type wavelet conversion is selected in the wavelet conversion filtering.

Wavelet conversion means with fixed-point precision comprises a wavelet converter which can be common to wavelet conversion means with integer precision, and a bit shifter. The wavelet converter which can be common to both means includes a multiplier or shift calculator, an adder/subtracter, and a register.

The integer precision type wavelet conversion means is inputted with a pixel or conversion coefficient with integer precision, subjects it to wavelet conversion, and outputs a conversion coefficient with integer precision. Also, the fixed-point precision type wavelet conversion means is inputted with a pixel or conversion coefficient with fixed-point precision, subjects it to wavelet conversion, and outputs a conversion coefficient with fixed-point precision.

To achieve the above object, in an image decoding device and a method thereof according to the present invention, fixed-point type wavelet reverse conversion or integer type wavelet reverse conversion is performed, and only a predetermined area of a decoded image generated through the wavelet reverse conversion is written and maintained in a memory means.

According to the present invention, a predetermined area of input image data is read and stored into a memory, and at image coding in which wavelet conversion filtering is performed on the image area in a horizontal or vertical direction as soon as data is stored in the memory means, either fixed-point type wavelet conversion or integer type wavelet conversion is selected. As a result, fixed-point type wavelet conversion with higher precision can be realized by a hardware structure substantially equivalent to integer type wavelet conversion.

Also, an increase of the hardware components can be reduced by adopting a structure common to the fixed-point type wavelet conversion means and the integer precision type wavelet conversion means.

In addition, an optimal wavelet conversion means can constantly be realized by controlling selection from both means in correspondence with the image quality or compression rate. For example, a mobile terminal such as a portable phone, PDA, or the like needs image transmission at a low bit-rate using a narrow band channel. Hence, the mobile terminal can operate for a long time without sacrificing the compression rate, if the integer precision type wavelet conversion means is used which is excellent in the point of saving the power consumption.

BRIEF DESCRIPTION OF THE DRAWINGS

FIGS. 3A and 3B, is a view showing examples of calculation word lengths at fixed-point precision and at integer precision;

FIG. 16 is a view for explaining an example of information indicating the type of wavelet conversion in a coded bit stream.

DETAILED DESCRIPTION OF THE INVENTION

In the following, with reference to the drawings, explanation will be made of an image coding apparatus and a method thereof and an image decoding apparatus and a method thereof, according to the present invention. In the embodiment described below, detailed explanation will be particularly made of a wavelet converter for use in the image coding apparatus, and a wavelet reverse-converter for use in the wavelet image decoding apparatus.

First Embodiment

Figure 1:
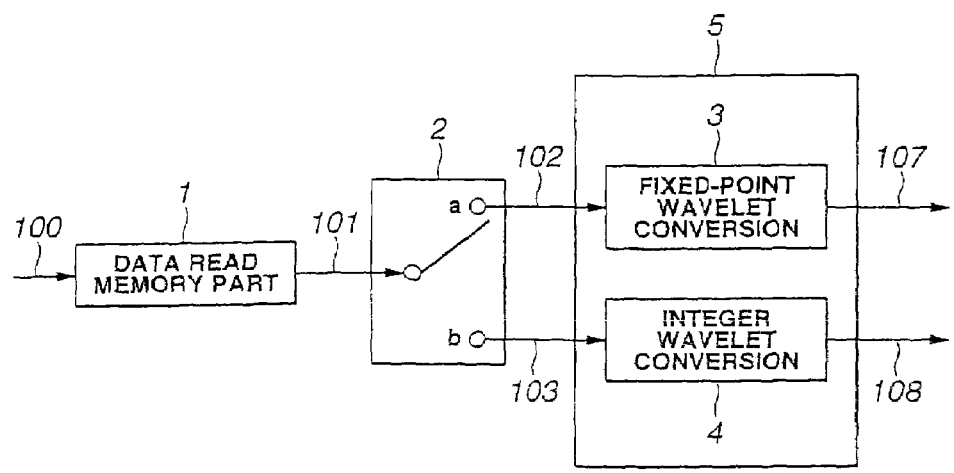
FIG. 1 is a block diagram showing a schematic structure of a wavelet converter for use in an image coding device as an embodiment of the present invention.

FIG. 1 shows a structural example of the wavelet converter for use in the image coding apparatus as a first embodiment of the present invention.

In FIG. 1, the device includes a data read memory section 1 for reading and storing input image data 100 only into a predetermined region, and a wavelet conversion section 5 for filtering the image region in the horizontal or vertical direction as soon as data is stored into the data read memory section 1. The wavelet conversion section 5 includes a fixed-point type wavelet conversion section 3 and an integer type wavelet conversion section 4, and is structured such that the output from the data read memory section 1 is switched at a switching section 2 and is sent to the fixed-point type wavelet conversion section 3 or the integer type wavelet conversion section 4.

Next, explanation will be made of operation of the first embodiment having the structure shown in FIG. 1.

At first, input image data 100 is read out orderly from the uppermost line, for every line or with respect to a specific region, and is inputted to the data read memory section 1. At the time when predetermined data is stored into the data read memory section 1, wavelet conversion filter processing is carried out in the horizontal and vertical directions. Normally, the filter used for filtering in the wavelet conversion is a filter having a plurality of taps. Immediately after a number of lines that are necessary for the filtering are stored, the wavelet conversion filter processing can be executed.

If the fixed-point type wavelet conversion section 3 is selected inside the wavelet conversion section 5, the switching section 2 is switched and connected to the side of a selected terminal a, and output data 101 from the data read memory section 1 is sent to the fixed-point type wavelet conversion section 3 as input data 102. Wavelet conversion processing is executed in this fixed-point type wavelet conversion section 3, so that a conversion coefficient 107 is outputted. Otherwise, if the integer type wavelet conversion section 4 is selected, the switching section 2 is switched and connected to the side of a selected terminal b. Output data 101 from the data read memory section 1 is supplied as input data 103 to the integer type wavelet conversion section 4, and wavelet conversion processing is performed thereon, so a conversion coefficient 108 is outputted.

In FIG. 1 showing the first embodiment, the fixed-point type wavelet conversion section 3 and the integer type wavelet conversion section 4 are illustrated as being independent from each other. However, both sections can actually have many sections common to their structures. Those common parts in their structures will be explained later.

Second Embodiment

Figure 2:
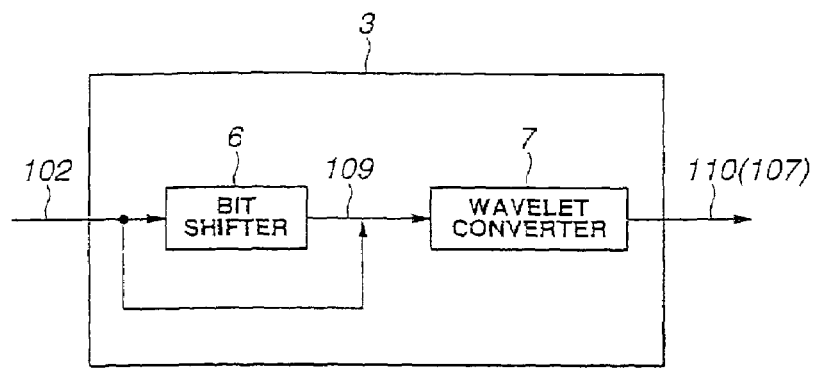
FIG. 2 is a block diagram showing a structural example of the fixed-point type wavelet conversion section.

The second embodiment of the present invention shows a practical form of the fixed-point type wavelet conversion section 3 which has been explained with reference to the first embodiment described above. FIG. 2 shows an example of the structure of the fixed-point type wavelet conversion section 3.

Figure 3:
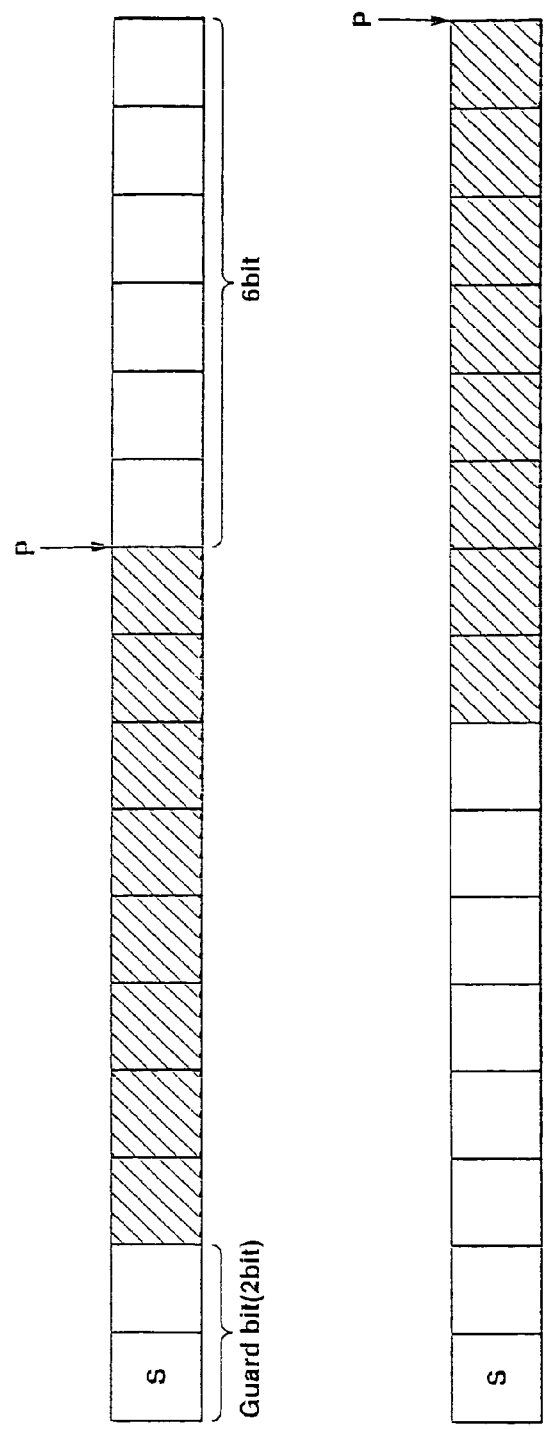
FIG. 3, including

That is, FIG. 2 shows a structural example of the fixed-point type wavelet conversion section 3 in the structure shown in FIG. 1, and the fixed-point type wavelet conversion section 3 in FIG. 2 is constructed, including a bit-shifter 6 and a wavelet converter 7. The bit-shifter 6 is used once with respect to input image data. For example, as shown in FIG. 3A, the bit-shifter 6 performs bit-shift processing on data with precision of the fixed-point. The point P shown in FIG. 3A indicates the position of the fixed decimal point. Bits in the upper side (left side in the figure) are of an integer part, and bits in the lower side (right side in the figure) are of a decimal part. In the example shown in FIG. 3A, the decimal part includes six bits, so precision of the fixed decimal point can be ensured with precision of $1/2^6 = 1/64$. In the example shown in FIG. 3A, the integer part deals with 8-bit data, and the entire parts perform 16-bit calculation (with calculation precision of 16 bits). The uppermost two bits (in the left end side in the figure) are comprised as guard bits one of which indicates a code (+/−) while another bit is prepared as a bit to avoid overflow.

In this respect, FIG. 3B shows an example of calculation with precision of integer, where bits up to the lowermost class (in the right end in the figure) are used as an integer part. Therefore, the point P indicating the decimal point exists in the right end (the lowermost side). In addition, the calculation of this integer precision comprises only the bit indicating the code (+/−).

Operation thereof will now be explained, referring back to FIG. 2.

The bit shifter 6 of this FIG. 2 operates only when input data 102 is image data, i.e., with respect to image data before wavelet conversion is performed at first. The bit shifter 6 does not operate thereafter. That is, the structure is arranged so as to pass data 102 through the bit shifter 6 such that data 102 as a wavelet conversion coefficient with which wavelet conversion has already been performed at least for one time (one stage) is directly used as a wavelet converter input 109, when wavelet conversion is carried out for a plurality of taps.

In addition, the wavelet conversion section 4 shown in FIG. 1 is constructed only by a wavelet converter 7 which does not include the bit shifter 6 shown in FIG. 2.

A general example of the structure and operation of wavelet conversion/reverse-conversion will be explained with reference to the drawings.

Figure 4:
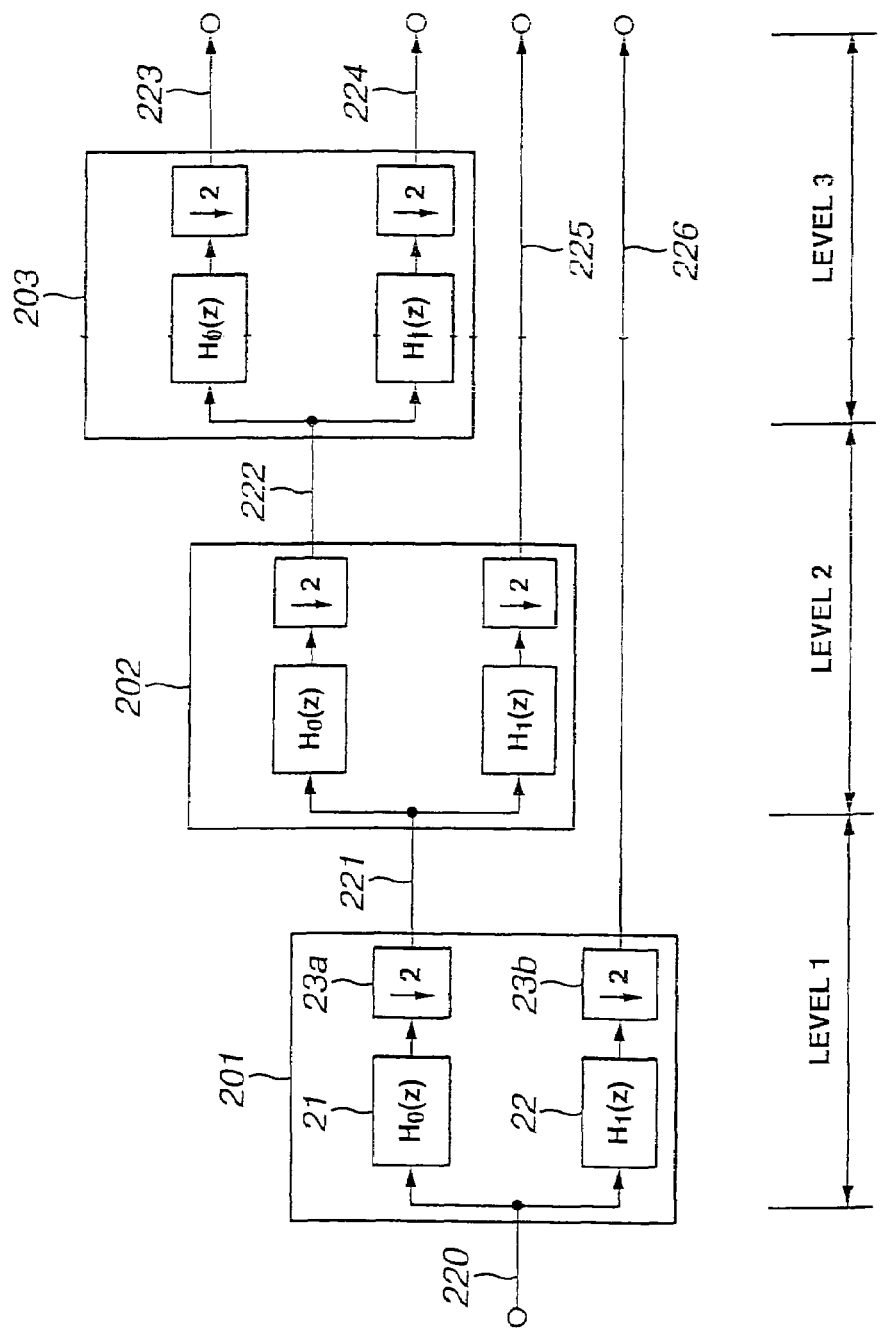
FIG. 4 is a block diagram showing a schematic structure of a normal wavelet conversion section (up to level 3)

At first, the structure shown in FIG. 4 will be cited as a structure of a normal wavelet conversion section. The example shown in FIG. 4 is a structural example in which octave division which is the most normal wavelet conversion among several methods. The case shown in this FIG. 4 adopts a structure in which the level number is 3 (levels 1 to 3), an image signal is divided into a low range and a high range, and only the component of the low range is divided into levels. Also, FIG. 4 exemplifies wavelet conversion with respect to a one-dimensional signal (e.g., the horizontal component of an image), for the sake of convenience. By expanding this wavelet conversion to two dimensions, it is possible to deal with two-dimensional image signals.

The input image signal 220 is divided into band ranges, firstly, by a low pass filter 21 (transfer function $H_0(z)$) and a high pass filter 22 (transfer function $H_1(z)$). Low and high range components thus obtained are respectively suppressed by corresponding down samplers 23a and 23b such that each resolution is multiplied by ½ (level 1). The outputs at this time are two of an L component 221 and an H component 226. The "L" and "H" are abbreviations of Low and High and indicate low and high ranges, respectively. The circuit section 201 of the level 1 is constructed by the low pass filter 21, high pass filter 22, and two down samplers 23a and 23b shown in this FIG. 4.

Of the signals suppressed by the down samplers 23a and 23b, only the component of the low range which is the signal from the down sampler 23a is further divided into components of band ranges by the low and high pass filters in the circuit section 202 of the level 2, resolutions of which are respectively suppressed to ½ (level 2) by corresponding down samplers. The circuit section 202 constructed by these low and high pass filters of the level 2 uses a structure similar to that of the circuit section 201 constructed by the low pass filter 21, high pass filter 22, and down samplers 23a and 23b.

The processing as described above is carried out up to a predetermined level, so band range components whose low range components are divided into band ranges are sequentially generated. The band range components generated at the level 2 are respectively a LL component 222 and an LH component 225. FIG. 4 shows an example in which band ranges are divided up to the level 3, and the output from the side of the low pass filter of the circuit section 202 in the level 2 is supplied to the circuit section 203 at the level 3, which has a structure similar to the circuit section 201. As a result of dividing the band ranges, a LLL component 223, LLH component 224, LH component 225, and H component 226 are generated.

Figure 5:
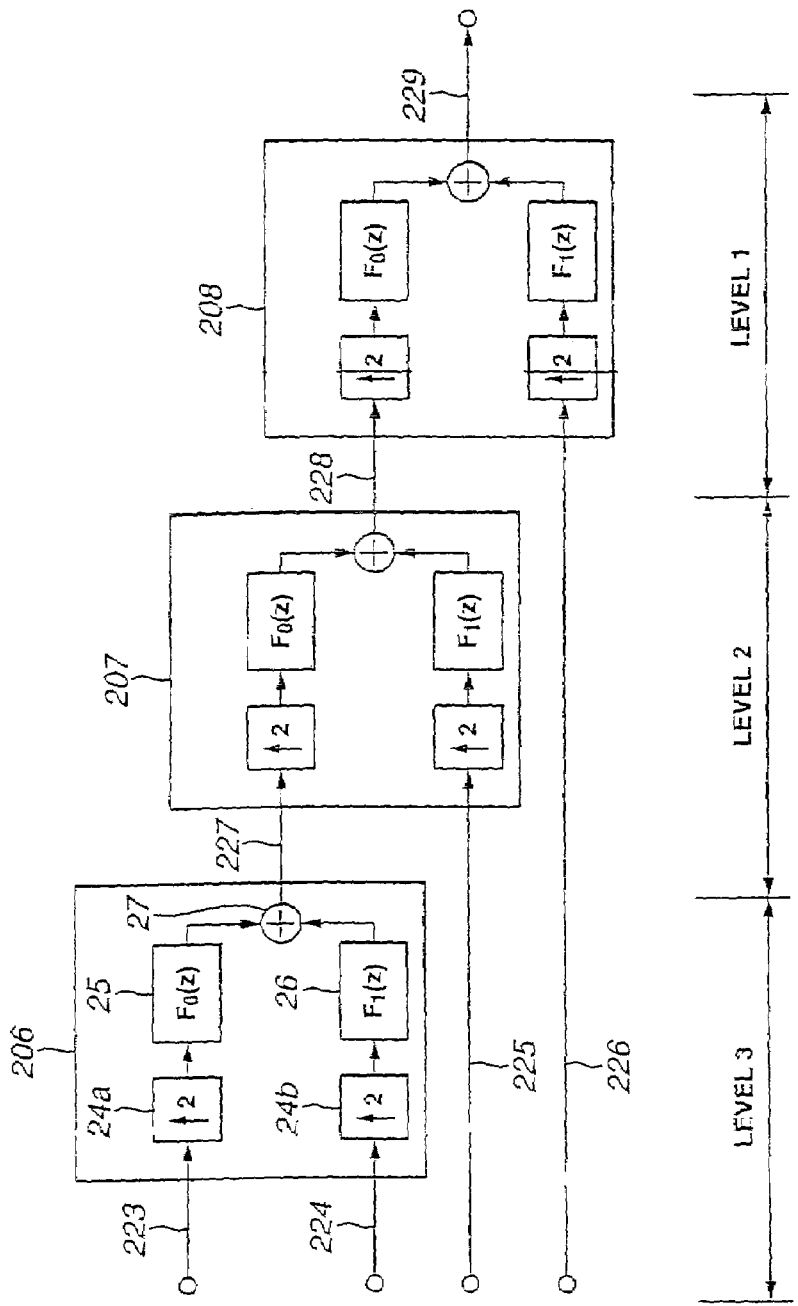
FIG. 5 is a block diagram showing a schematic structure of a normal wavelet reverse conversion section (up to level 3)

Next, FIG. 5 shows a specific structural example of the wavelet reverse-conversion section which performs reverse operation on the wavelet conversion section shown in FIG. 4.

That is, after the band ranges 223, 224, 225, and 226 as outputs of the wavelet conversion section 2 explained with reference to FIG. 4 are inputted to the wavelet conversion section shown in FIG. 5, the LLL component 223 and the LLH component 224 are firstly up-sampled by the up-samplers 24a and 24b such that each of the resolutions thereof is multiplied twice. Subsequently, the component of the low range is filtered by the low pass filter 25, as well as the component of the high range by the high pass filter 26. The components of both ranges are synthesized by an adder 27. By the circuit section 206 up to this adder, reverse processing, which is reversal of the conversion at the circuit section 203 of the level 3 in FIG. 4 is completed, so an LL component 227 as a range component in the low range side of the level 2 is obtained. This processing is thereafter repeated up to the level 1, thereby to output a decoded image 229 after final reverse conversion. That is, the circuit section 207 of the level 2 and the circuit section 208 of the level 1 have a structure similar to the circuit section 206 of the level 3. The output of the circuit section 206 of the level 3 is sent as the input in the low range side of the circuit section 207 of the level 2, as well as the output of the circuit section 207 of the level 2 is sent as the input in the low side of the circuit section 208 of the level 1. The above is the basic structure of a normal wavelet conversion section.

Figure 6:
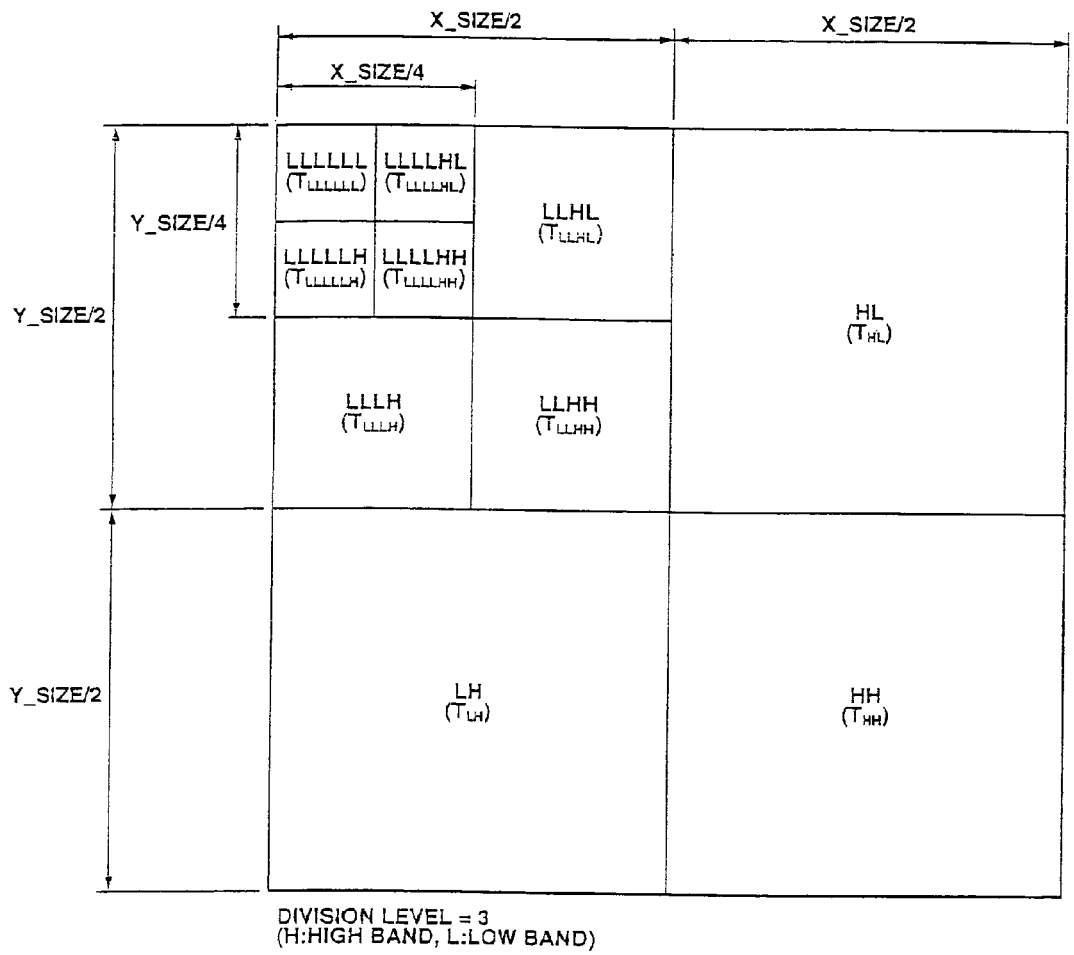
FIG. 6 is a view for explaining a band division (division level=3) of a two-dimensional image.

FIG. 6 shows band components obtained as a result of dividing a two-dimensional image up to the level 3. The method of expressing the "L" and "H" in this FIG. 6 differs from the method of expressing the "L" and "H" shown in FIGS. 4 and 5 which deal with a one-dimensional signal. That is, in FIG. 6, the image is firstly divided into four components LL, LH, HL, and HH by band division (in horizontal/vertical directions) of the level 1. The sign "LL" means that both of the horizontal and vertical components are L and the sign "LH" means that the horizontal component is H and the vertical component is L. Next, the component LL is subjected again to band-division to generate LLLL, LLHL, LLLH, and LLHH. Further, the component LLLL is subjected again to band-division to generate LLLLLL, LLLLHL, LLLLLH, and LLLLHH. Note that $T_{LLLLLL}$, $T_{LLLLHL}$, $T_{LLLLLH}$, $T_{LLLLHH}$, $T_{LLHL}$, $T_{LLLH}$, $T_{LLHH}$, $T_{LH}$, $T_{HL}$ and $T_{HH}$ shown in FIG. 6 indicate weight coefficients for every sub-band. As shown in FIG. 6, all band range is divided equally, in addition to the division of the low band component into levels.

Third Embodiment

Next, explanation will be made with reference to the third embodiment of the present invention. In this third embodiment, the structures of internal wavelet converters are arranged equal to each other between the integer type wavelet conversion section 3 and the fixed-point type wavelet conversion section 4 in FIG. 1. In the following, specific calculations of the integer type wavelet conversion and the fixed-point type wavelet conversion will be explained.

Figure 7:
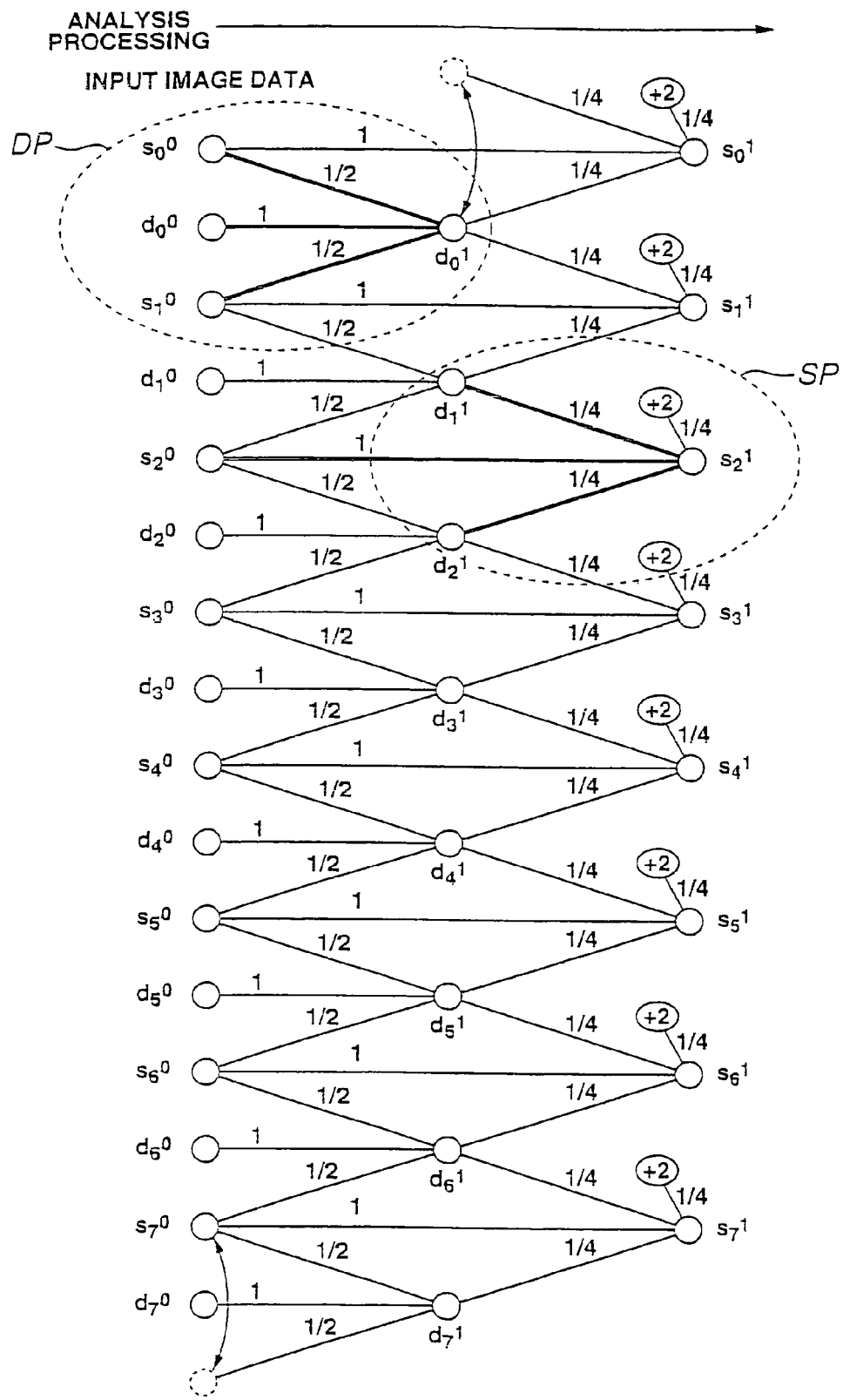
FIG. 7 is a view for explaining a calculation of an integer precision type wavelet conversion filter in the analysis side.

At first, with reference to FIG. 7, explanation will be made of an integer type wavelet conversion calculation, integer precision type 5×3 filter (analysis side), which is defined in FCD (Final Committee Draft) of JPEG-2000 Part-1. FIG. 7 is a view for explaining the calculation of the integer precision type 5×3 filter. This figure shows an operation of performing one-dimensional wavelet conversion, to convert input image data in the left end into a low band component s and a high-band component d. In the following, specific operation will be explained with reference to this figure. Suppose that $d_m^n$ is the m-th high-band component coefficient of wavelet conversion on the level n. Similarly, $S_m^n$ is the m-th low-band component coefficient of wavelet conversion on the level n. In case where n=0 is given, the input image itself is takes, as shown in FIG. 7.

As shown in this FIG. 7, the expression for calculating the low-band component coefficient s is generally given by:

. . . (1)

The calculation of ¼ in this expression can be realized by bit-shifting. Where a shift to the right by two bits is expressed as ">>2", the expression (1) can be expressed as follows.

. . . (1')

The "+2" in the parentheses in the expression (1) is to compensate for a rounding error which occurs at the time of right shift.

The expression for calculating the high-band component coefficient d can be generally expressed as follows.

. . . (2)

Or, it is obtained by the following expression by expressing a shift to the right by one bit as ">>1".

. . . (2')

In the example shown in FIG. 7, the wavelet conversion coefficient for input image data in the first level, i.e., the low-band component coefficient and the high-band component coefficient at the level n=1 are calculated. The "s" and "d" of input image data in this case do not express the low-band component coefficient and the high-band component coefficient. Also, at the positions corresponding to end portions of the screen, data corresponding to the outer part of the screen is used as folded data outside the screen. For example, $s_0^0$, $d_0^1$, and $d_0^1$ as a folded result of $d_0^1$ are used in order to obtain data $s_0^1$ in FIG. 7. Likewise, $s_7^0$ is used twice in order to obtain $d_7^1$.

The part SP surrounded by a broken line in FIG. 7 is the part where the low-band component coefficient $s_2^1$ corresponding to the case of n=0 and m=1 in the expression (1). The following calculation is carried out.

The part DP surrounded by a broken line in FIG. 7 is the part where the high-band component coefficient $d_0^1$ corresponding to the case of n=0 and m=0 in the expression (2). The following calculation is carried out.

As has been already described, the multiplication of ¼ in the above calculation can be realized by ">>2" which is a shift to the right by two bits and the multiplication of ½ can be realized by ">>1" which is a shift to the right by one bit.

With respect to the calculation amounts required for calculating the expressions (1) and (2), the multiplications are realized by the shift calculation described above, and multiplication of 0, addition/reduction of 5, and shift calculation of 2 are given. By performing this operation from the top to the bottom in a similar manner, all coefficients can be calculated. As has already described above, wavelet conversion needs only to be performed on the group of coefficients, which have been generated by the wavelet conversion in one-dimensional direction (e.g., in the vertical direction), in another direction (e.g., in the horizontal direction), in a manner similar to the above.

Figure 8:
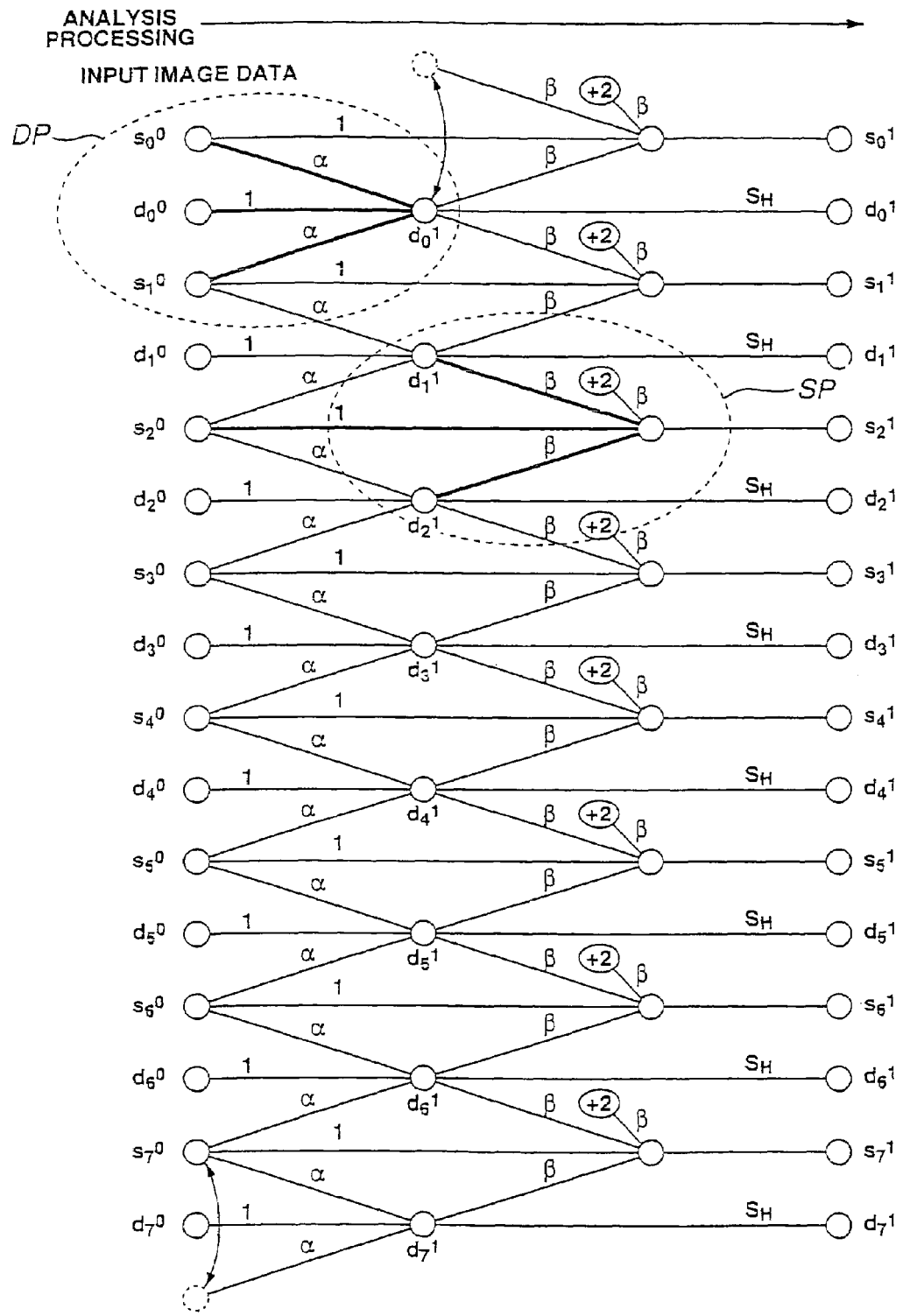
FIG. 8 is a view for explaining a calculation of a fixed-point type wavelet conversion filter in the analysis side.

Next, with reference to FIG. 8, explanation will be made of a fixed-point type wavelet conversion calculation in the analysis side using a fixed-point precision 5×3 filter. FIG. 8 shows an operation in which one-dimensional is performed to convert input image data at the left end, into a low-band component s and a high-band component d. In the following, specific operation will be explained with use of the same figure. Suppose now that $d_m^n$ is the m-th high-band component coefficient of wavelet conversion on the level n. In case of n=0, it is apparent that it is an input image. Suppose similarly that $s_m^n$ is the m-th low-band component coefficient of wavelet conversion on the level n.

As is apparent from this FIG. 8, the expression for calculating the low-band component coefficient s is generally given by the following expression.

. . . (3a)

Or, it is given by the following expression.

. . . (3b)

Similarly, the expression for calculating the high-band component coefficient d is obtained by the following expression.

. . . (4)

Hence, α=0.5 and β=0.25 are obtained, and d which is the high-band component is Nyquist gain=2 in the analysis side. Therefore, gain adjustment is made so as to attain Nyquist gain=1. This is the reason why the high-band component coefficient d is multiplied by $S_H$=−0.5. In case of the integer precision 5×3 filter described above, gain adjustment need not be carried out because reversible conversion is not guaranteed if gain adjustment is carried out. Peripheral techniques thereof will be known as general digital signal processing methods.

When data concerning the outer part of the screen is required to calculate data concerning the positions of the screen end parts, folded data inner parts of adjacent screens are used (e.g., $d_0^1$ for obtaining $s_0^1$ shown in FIG. 8), like the case of FIG. 7 described above. This is the same to the cases of FIGS. 9 and 10 described later.

Explained next will be a difference between the expressions (3a) and (3b). In the fixed-point precision 5×3 filter, the precision is higher compared with the integer precision, and therefore, both of the expression (3a) (compatible) in case of carrying out rounding of +2 explained with reference to the integer precision 5×3 filter and the expression (3b) (incompatible) without +2 can be considered.

In case where structures of calculation means are arranged to be common to each other between this fixed-point precision 5×3 filter and the integer precision 5×3 filter described above, it is necessary to use the expression (3a). That is, in case where the calculation of the above expression (3a) is used as a wavelet converter used for the fixed-point precision 5×3 filter, it is possible to use it as a wavelet converter common to the integer precision 5×3 filter.

In this fixed-point precision 5×3 filter explained with reference to FIG. 8, the calculation amount required to generate a pair of a low-band component and a high-band component is multiplication of 3, addition/reduction of 5 (compatible), or addition/reduction of 4 (incompatible).

Fourth Embodiment

Next, the fourth embodiment of the present invention will be explained. In contrast to the third embodiment whose contents are related with the analysis filter for wavelet conversion, the fourth embodiment embodies a wavelet reverse conversion filter (synthesizer filter). At first, FIG. 9 is used to explain calculations of an integer precision type 5×3 filter (in the synthesis side) defined in FCD of Part-1 of JPEG-2000.

Figure 9:
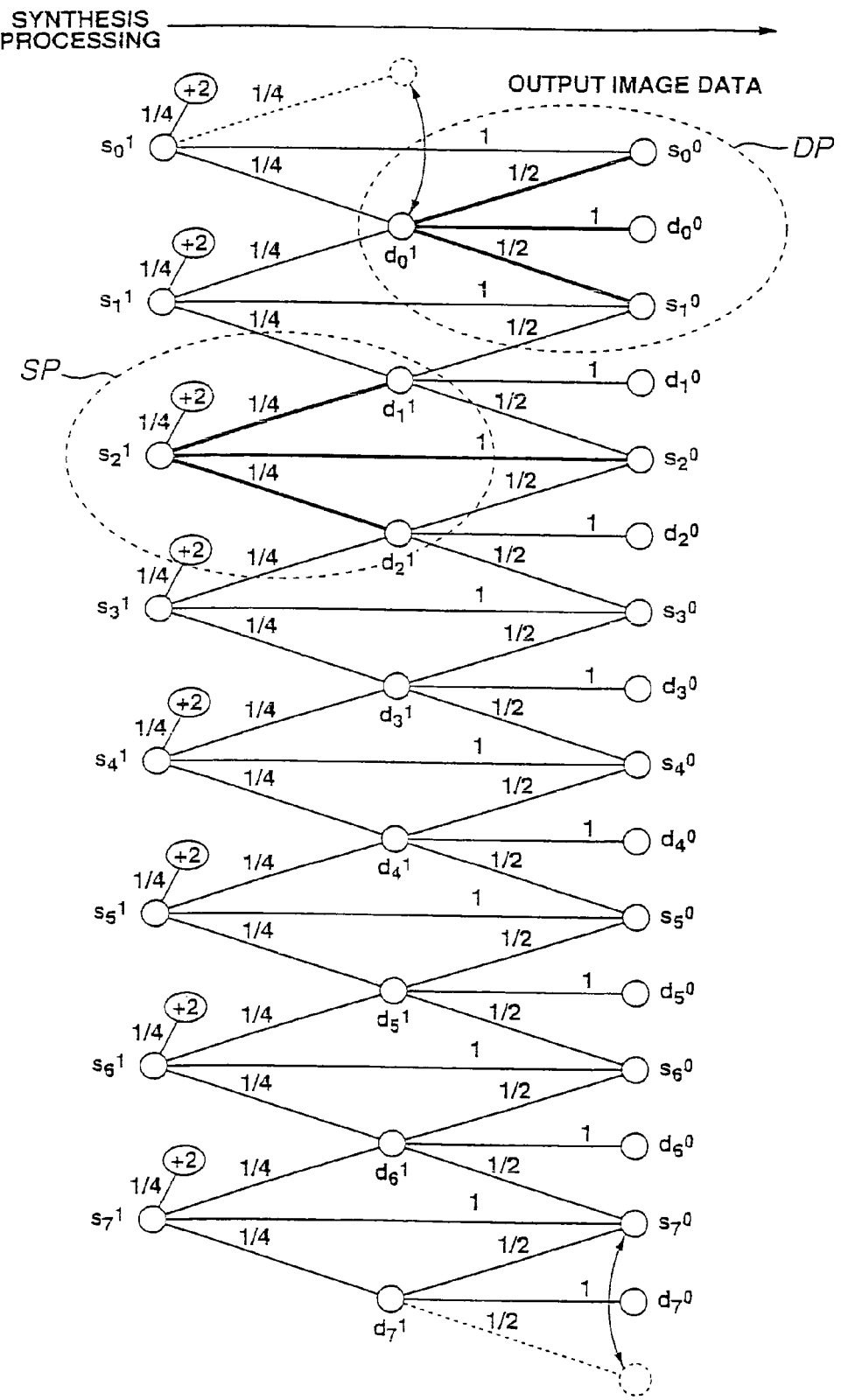
FIG. 9 is a view for explaining a calculation of an integer precision type wavelet reverse conversion filter in the synthesis side.

FIG. 9 is a view for explaining calculation in the integer precision type synthesis filter of 5×3 and shows a state in which one-dimensional wavelet conversion is performed to calculate output image data at the right end in the figure, from the low-band component s at the left end and the high-band component d at the center part in the figure. Suppose that $d_m^n$ is the m-th high-band component coefficient of wavelet conversion on the level n. Suppose also that $s_m^n$ is the m-th low-band component coefficient of wavelet conversion on the level n. In case of n=0, an output image is obtained, as shown in FIG. 9.

As shown in FIG. 9, the expression for calculating the low-band component coefficient s of the level which is lower by one level is generally given by the following expression.

... (5)

Where the multiplication of ¼ in this expression (5) is realized by a bit shift and a shift to the right by two bits is expressed as ">>2", the above expression (5) can be expressed as follows.

... (5')

The "+2" in the parentheses in the expression (5) or (5') responds to a rounding error which occurs in the right shift. However, this works in close cooperation with the rounding processing in the analysis side, which has been explained in the third embodiment. Of course, it is necessary for maintenance of reversibility that the rounding processing is equal between the analysis side and the synthesis side.

Similarly, the expression for calculating the high-band component coefficient d is generally given by the following expression.

... (6)

Or it is given as follows if a right shift by one bit is expressed as ">>1".

... (6')

The part SP surrounded by a broken line in FIG. 9 is a part which obtains a low-band component coefficient $s_2^0$ corresponding to n=0 and m=1 in the expression (5). The following calculation is carried out.

The part DP surrounded by a broken line in FIG. 7 is a part which obtains a high-band component coefficient $d_0^0$ corresponding to n=0 and m=0 in the above expression (2). The following calculation is carried out.

As has already been explained, the multiplication of ¼ can be realized by a shift to the right by two bits, i.e., ">>2", and the multiplication of can be realized by a shift to the right by one bit, i.e., ">>1".

Calculation amounts required for calculating the expressions (5) and (6) and particularly the expressions (5') and (6'), i.e., calculation amounts required for generating a pair of an even-numbered coefficient and an odd-numbered coefficient are 0 for multiplication, 5 for addition/reduction, and 2 for shift calculation. By performing similarly this operation from the top to the bottom, all the coefficients can be calculated. As has already been explained, with respect to a two-dimensional signal such as an image, wavelet reversal conversion may be performed on the group of coefficients, which are generated by wavelet reversal conversion (synthesis filter processing) in a one-dimensional direction (e.g., the vertical direction), in another direction (e.g., the horizontal direction).

Figure 10:
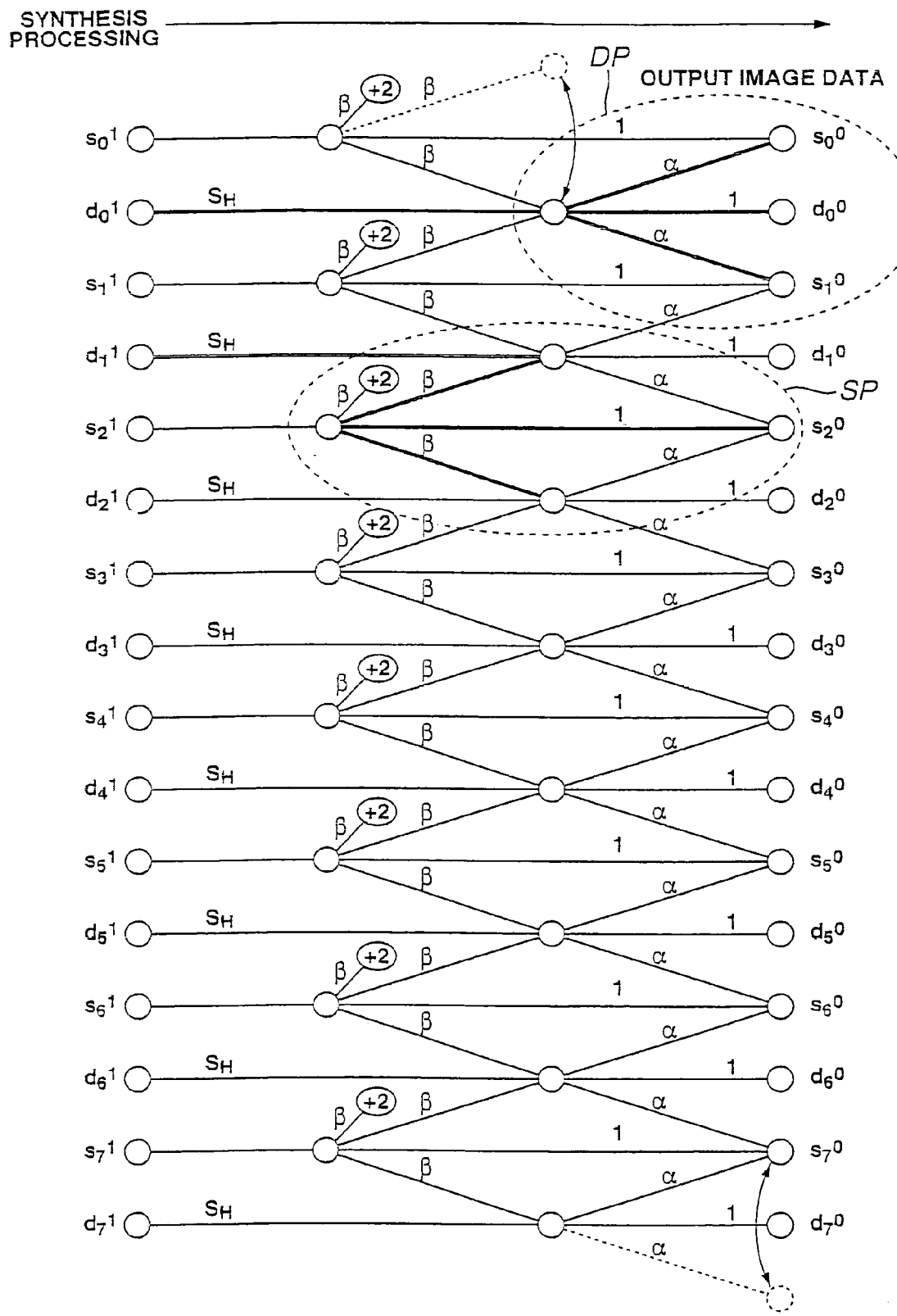
FIG. 10 is a view for explaining a calculation of a fixed-point type wavelet reverse conversion filter in the synthesis side.

Next, with reference to FIG. 10, explanation will be made of a calculation in fixed-point type wavelet reversal conversion using a fixed point precision 5×3 filter. FIG. 10 shows an operation in which one-dimensional wavelet conversion (reversal conversion) is performed to convert the low-band component s and the high-band component d at the left end in the figure, into output pixels at the right end in the figure. In the following, specific operation will be explained with reference to the figure. Suppose that $d_m^n$ is the m-th high-band component coefficient of wavelet conversion on the level n. Suppose also that $s_m^n$ is the m-th low-band component coefficient of wavelet conversion on the level n. Where n=0 is given, s and d are respectively an odd-numbered pixel and an even-numbered pixel.

As can be seen from FIG. 10, the expression for calculating an odd-numbered pixel s at the right end in the figure or a low-band coefficient s is generally given by the following expression.

... (7a)

Or, it is given by the following expression.

... (7b)

Likewise, the expression for calculating an even-numbered pixel d at the right end in the figure or a high-band coefficient d is generally given by the following expression.

... (8)

Here, $\alpha=0.5$ and $\beta=0.25$. are obtained. As described above in the third embodiment, d corresponding to the high-band component is Nyquist gain=2 in the analysis side. Therefore, gain adjustment is made to attain Nyquist gain=1. In the analysis side, the high-band component coefficient d is multiplied by $S_H=-0.5$. In contrast, the Nyquist gain must be returned to 2 from 1, in the synthesis side. Therefore, after multiplying the high-band coefficient d by $S_H=-2.0$, the above expression (8) is carried out.

Explained next will be a difference between the expressions (7a) and (7b). In the fixed-point precision 5×3 filter, the precision is higher compared with the integer precision, and therefore, both of the expression (7a) (compatible) in case of carrying out rounding of +2 and the expression (7b) (incompatible) without +2 can be considered, like the rounding processing in the analysis side explained above.

In case where structures of calculation means are arranged to be common to each other between this fixed-point precision 5×3 filter and the integer precision 5×3 filter described above, it is necessary to use the expression (7a).

In this fixed-point precision 5×3 filter explained with reference to FIG. 10, the calculation amount required to generate a pair of a low-band component and a high-band component is 3 for multiplication, 5 for addition/reduction (compatible), or 4 for addition/reduction (incompatible).

Fifth Embodiment

In the fifth embodiment of the present invention, all of a multiplier or a shift calculator, an adder/subtracter, and a register as components are arranged to be common between the wavelet converter of the integer type wavelet conversion section 4 and the wavelet converter of the fixed-point type wavelet conversion section 3. As described above, it is apparent that the wavelet converter is constructed by a multiplier, a shift calculator, or an adder/subtracter. To construct it as hardware, a register for temporarily storing data is required. With respect to the wavelet reverse converter (synthesis filter), the structures of an integer type filter and a fixed-point type filter can be arranged to be common to each other.

Figure 11:
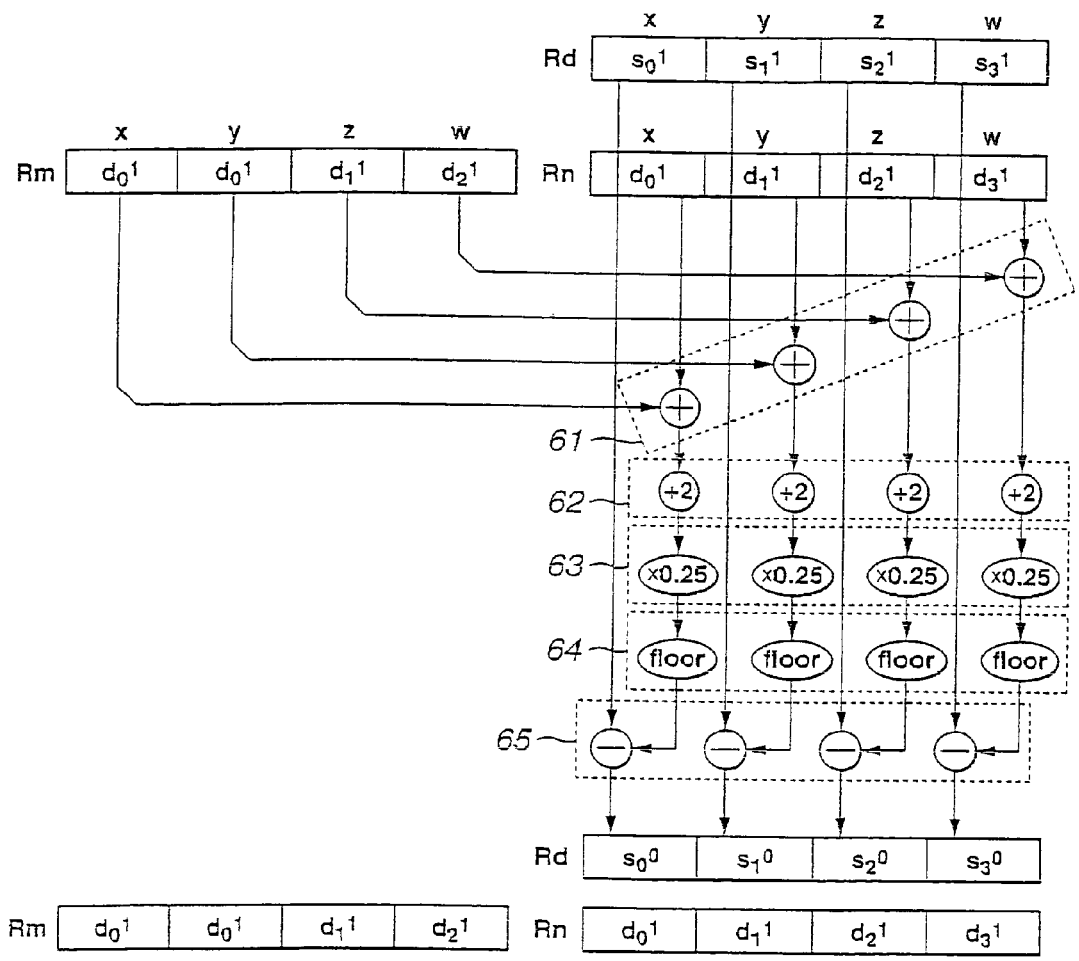
FIG. 11 is a view showing an example of a hardware structure for calculating a coefficient of a low-band component or pixel value in the synthesis side (in case of level 0)
Figure 12:
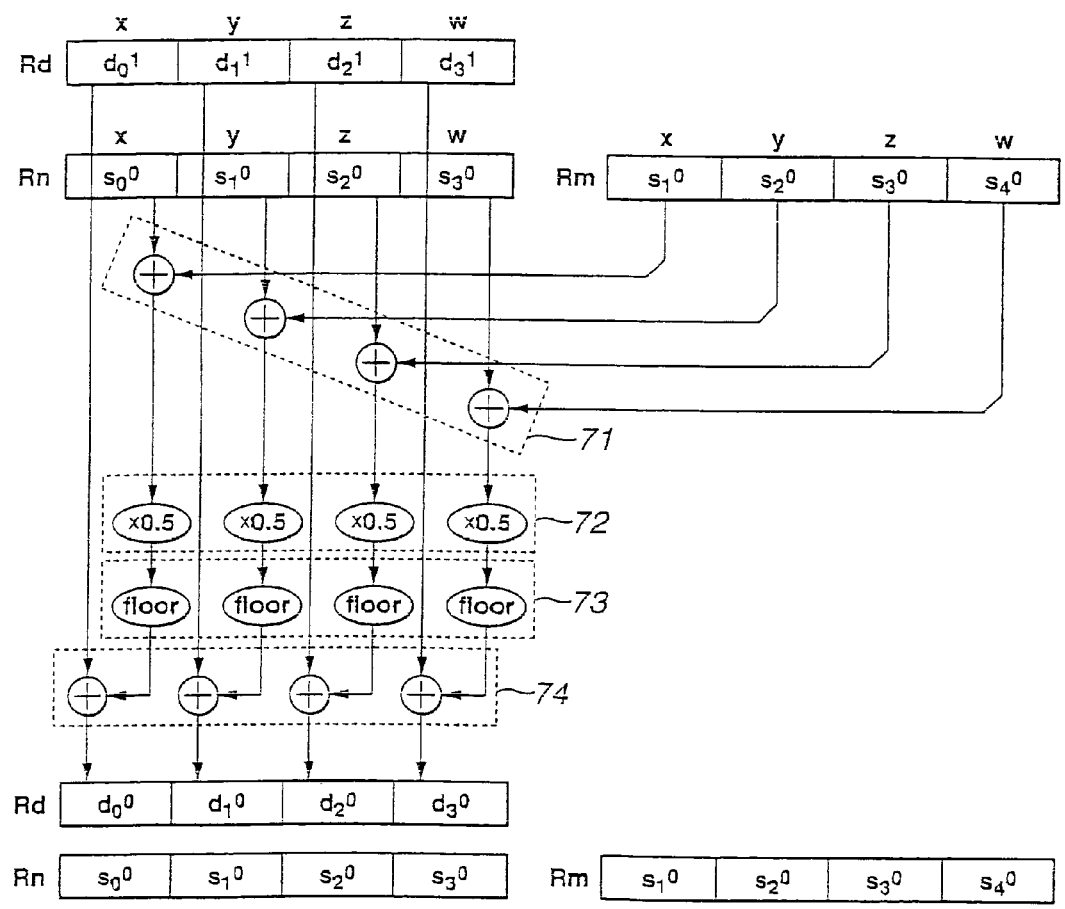
FIG. 12 is a view showing an example of a hardware structure for calculating a coefficient of a high-band component or pixel value in the synthesis side (in case of level 0)

FIGS. 11 and 12 show an example of a hardware structure for calculating the coefficients of the high-band and low-band components in the synthesis side. At first, with reference to FIG. 11, explanation will be made of the structure for calculating the coefficient value or pixel value (in case of level 0) of the low-band component. For convenience of the explanation, it is supposed that three registers Rm, Rn, and Rd, adders 61, 62, and 65 indicated by +, +2, and — in the figures, a multiplier 63 for calculation of ×0.25, and a rounding device 64 indicated by floor are constructed with a rounding device 64 included. Also, the registers Rm, Rn, and Rd are each constructed in a structure capable of storing four values of x, y, z, and w. By performing a predetermined filtering calculation on coefficient values stored in the registers, a coefficient value or a pixel value (in case of the level 0) in the lower level by one level is calculated.

That is, four values (e.g., $d_0^1$, $d_0^1$, $d_1^1$, and $d_2^1$) from the register Rm are respectively added with four values (e.g., $d_0^1$, $d_1^1$, $d_2^1$, and $d_3^1$) from the register Rn, by the adder 61. The addition results each are added with 2, and four output values from the adder 62 are each multiplied by 0.25 (or shifted to the right by two bits). Rounding processing is performed each of the multiplication results by the rounding device 64 to obtain four values which are then sent to the adder 65. These four values are respectively subtracted from four values (e.g., $s_0^1$, $s_1^1$, $s_2^1$, and $s_3^1$) supplied from the register Rd, thereby to calculate coefficient values or pixel values (e.g., $s_0^0$, $s_1^0$, $s_2^0$, and $s_3^0$) of the low-band component in the lower level by one level.

In addition, if an integer register having a certain bit length is provided, filtering can be executed with the integer precision which has previously described. Otherwise, if a fixed-point register having a certain bit length, filtering can be executed at fixed-point precision which has already been described. In addition, this can be realized without changing the hardware structure at all except for the precision of the register. Thus, components of the hardware structure can be arranged to be common to each other.

In the specific structure of FIG. 11, the low-band component is stored in the register Rd, the high-band component is stored in the registers Rm and Rn, and a calculation result is newly stored in the register Rd. In this manner, coefficients which have been used and have become unnecessary are overwritten, and thus, it is efficient that extra registers need not be used. In addition, this contributes to reduction of hardware.

With respect to the specific example of rounding processing of the rounding device 64 shown in FIG. 11, the drop by means of the floor is not a drop for omitting decimals but is defined so as to perform rounding decimals toward an integer which is a smaller value. According to this definition, for example, the followings are obtained.

+2.3 +2 (positive value)

−2.3 −3 (negative value)

Next, with reference to FIG. 12, explanation will be made of the structure for calculating the coefficient value or pixel value (in case of the level 0) of the high-band component. For conveniences of the explanation, it is supposed that the structure is constructed by three registers Rm, Rn, and Rd, adders 71 and 74, a multiplier 72 for making operation of ×0.5, and a rounding device 73 indicated as floor. Also, the registers Rm, Rn, and Rd are each constructed in a structure capable of storing four values of x, y, z, and w. By performing a predetermined filtering calculation on coefficient values stored in the registers, coefficient values or pixel values (in case of level 0) in the lower level by one level are calculated.

That is, four values (e.g., $s_0^0$, $s_1^0$, $s_2^0$, and $s_3^0$) from the register Rn are respectively added with four values (e.g., $s_1^0$, $s_2^0$, $s_3^0$, and $s_4^0$) from the register Rm, by the adder 71. The addition results are each multiplied by 0.5 (or shifted to the right by one bit) by the multiplier 72. Rounding processing is performed each of the multiplication results by the rounding device 73 to obtain four values which are then sent to the adder 74. These four values are respectively subtracted from four values (e.g., $d_0^1$, $d_0^1$, $d_1^1$, and $d_2^1$) supplied from the register Rd, thereby to calculate coefficient values or pixel values (e.g., $d_0^0$, $d_1^0$, $d_2^0$, and $d_3^0$) of the high band component in the lower level by one level. Among the four values (e.g., $d_0^1$, $d_0^1$, $d_1^1$, and $d_2^1$) of the register Rd, $d_0^1$ is used twice because data positioned at an outer part of the screen at an end of the screen is compensated for adjacent data of an inner part of the screen (refer to $d_0^1$ in FIG. 9 and a circle of a broken line as folding thereof) as has already been explained above.

Also, in the case of the specific structure shown in FIG. 12, the structures of the integer type filter and the fixed-point filter are arranged to be common to each other without changing the hardware structure at all, merely by using the registers Rm, Rn, and Rd as integer registers or fixed-point registers, like in the specific example shown in FIG. 11. In addition, the rounding processing of the rounding device 73 indicated as the floor in FIG. 12 is also not defined as a drop omitting decimals but is defined so as to perform rounding of decimals toward an integer which is a smaller value. Also, in the specific example shown in FIG. 12, the low-band component is stored in the registers Rm and Rn, and the high-band component is stored in the register Rd, and a calculation result is newly stored in the register Rd. In this manner, coefficients which have been used and have become unnecessary are overwritten. Therefore, it is efficient that extra registers need not be used. In addition, this contributes to reduction of hardware. It is obvious that there are other usages of these registers than those described above. The larger the register, the larger the data amount which can be stored. At the same time, the amount which can be subjected to filtering increases, contributing to achieve higher speed processing.

Meanwhile, the multipliers 63 and 72 shown in FIGS. 11 and 12 can be substituted by shift calculators. Specifically, it is apparent that the multiplier 63 for ×0.25 shown in FIG. 11 corresponds to a shift to the right by two bits and the multiplier 72 for ×0.5 shown in FIG. 12 corresponds to a shift to the right by one bit. It is generally known that a shift calculator can be more easily constructed as hardware than a multiplier and is thus more efficient.

Sixth Embodiment

The sixth embodiment of the present invention is arranged such that the fixed-point type wavelet conversion means is selected when reverse coding is carried out in a structure in which the integer precision type wavelet conversion and the fixed-point precision type wavelet conversion can be switched to each other, as shown in FIG. 1. When irreversible coding is carried out, the fixed-point type wavelet conversion means is selected.

That is, as has been explained in the fifth embodiment, the integer precision type wavelet conversion and the fixed-point precision type wavelet conversion are arranged to be common to each other, with respect to other points than the bit precision. However, in the fixed-point precision type, bits for precision of decimals are required, so that a larger register than the integer precision type is necessary. This leads to enhancement of hardware. In case of performing reversible wavelet conversion necessary for reversible coding (Lossless) which is supported by FDC in Part-1 of JPEG-2000, it is more preferable to select integer precision type wavelet conversion because it uses less hardware, considering that the integer precision type wavelet conversion and the fixed-point precision type wavelet conversion can be realized without problems if rounding processing is unified between the analysis side and the synthesis side, as described previously. On the other hand, irreversible coding (Lossy) requires high precision in many cases. It is therefore better to select the fixed-point precision type wavelet conversion.

In consideration of the above points, the conversion is switched to the integer type wavelet conversion if lossless reversible coding is selected. Otherwise, if lossy irreversible coding is selected, the conversion is switched to the fixed-point type wavelet conversion. It is thus possible to realize wavelet conversion optimum for every coding type.

Seventh Embodiment

The seventh embodiment of the present invention is, for example, arranged such that the fixed-point type wavelet conversion means is selected if coding which takes image quality to be important is carried out in the structure in which the integer precision type wavelet conversion and the fixed-point precision type wavelet conversion can be switched to each other, as described above. Otherwise, if reduction of hardware, saving of power consumption, and low bit-rate coding are carried out, the integer type wavelet conversion means is selected.

This considers the ordinary case that the fixed-point type wavelet conversion capable of maintaining higher precision than the integer precision is selected if high precision (high image quality) is aimed. When reduction of hardware, saving of power consumption, and high compression (low bit-rate coding) are taken to be important, it is better to select the integer type wavelet conversion means. It is natural that the fixed-point type wavelet conversion which requires a register having a long bit length to improve the bit precision results in a larger hardware scale, and that the scale of calculators such as adders and the like increases accordingly.

In addition, the compression rate, i.e., the bit rate is greatly influenced by quantization processing as processing after wavelet conversion. In a quantization method in this quantization processing, a wavelet conversion coefficient value x is divided by a quantization index value Δ, to obtain a value which is taken as a quantization coefficient Q, as shown in the following expression (9).

. . . (9)

In this expression, x is a wavelet conversion coefficient value, and Δ is a quantization index value.

If the quantization index value or quantization step size is set to a large value, the quantization coefficient obtained by dividing the wavelet conversion coefficient value is small, so that the compression rate is high and the image quality is deteriorated. Inversely, if the quantization step size is set to be small, the quantization coefficient obtained by dividing the wavelet conversion coefficient value is large, so that the compression rate is low and the image quality is improved. Thus, a predetermined compression rate or predetermined image quality can be obtained by controlling this quantization index value.

In case of high compression (low bit-rate coding), the wavelet conversion coefficient value x is divided by a relatively large quantization index value Δ, as can be seen from the expression (9). Therefore, an outputted quantization coefficient reduces differences in precision among the original wavelet conversion coefficients. That is, the difference between the wavelet conversion coefficient of the fixed-point precision and the wavelet conversion coefficient of the wavelet conversion coefficient becomes very small.

On the grounds described above, in case of high compression (low bit-rate coding), it is better to select integer type wavelet conversion means.

Eighth Embodiment

Figure 13:
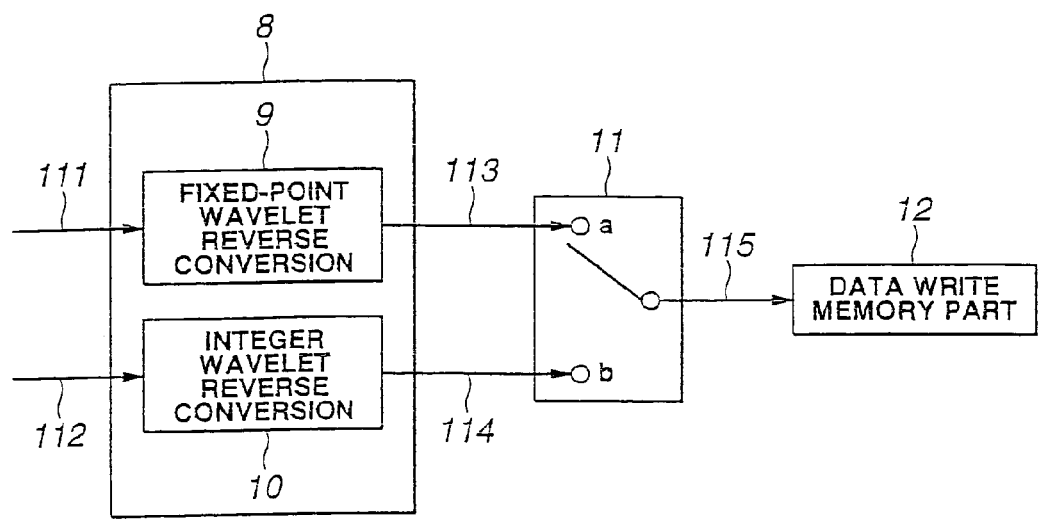
FIG. 13 is a block diagram showing an example of a structure of a wavelet reverse converter of an image decoding device.

The eighth embodiment presents a wavelet reverse conversion section in the side of a decoder or in the synthesis side, with respect to a wavelet conversion section in the side of a coding device of an image or the analysis side as described above. FIG. 13 is a view showing a structure of a wavelet reverse converter corresponding to a wavelet converter of the image decoder shown in FIG. 1.

In this FIG. 13, the wavelet reverse conversion section 8 corresponds to the wavelet conversion section 5 shown in FIG. 1. A conversion coefficient 107 from the fixed-point type wavelet conversion section 3 shown in FIG. 1 is supplied as a conversion coefficient 111 shown in FIG. 13, to the fixed-point type wavelet reverse conversion section 9. A conversion coefficient 108 from the integer type wavelet reverse conversion section 4 is supplied, as a conversion coefficient 112 shown in FIG. 13, to the integer type wavelet reverse conversion section 10. An output 113 from the fixed-point type wavelet reverse conversion section 9 is sent to a selected terminal a of the switching section 11, and an output 114 from the integer type wavelet reverse conversion section 10 is sent to a selected terminal b of the switching section 11. An output 115 from this switching section 11 is sent to a data write memory section 12.

Next, the operation will be explained. The wavelet reverse conversion section 8 comprises a fixed-point type wavelet conversion section 9 and an integer wavelet reverse conversion section 10. When a wavelet conversion coefficient 111 with fixed-point precision is inputted, the fixed-point type wavelet reverse converter 9 performs reverse conversion and outputs a decoded image 113.

On the other hand, when a wavelet conversion coefficient 112 with integer precision is inputted, the integer type wavelet reverse converter 10 performs reverse conversion and outputs a decoded image 114. Either the decoded image 113 or decoded image 114 is selected by the switch of the switching section 11 and is inputted to a data write memory section 12. In this data write memory section 12, the image corresponding only to the area of the decoded image is written into the memory.

Figure 14:
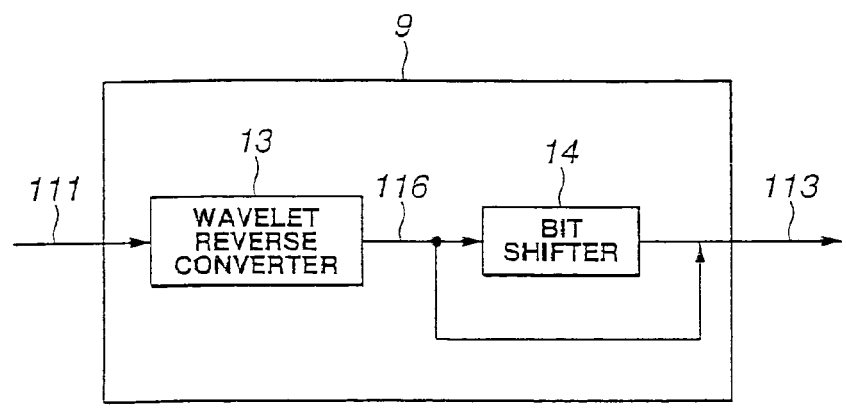
FIG. 14 is a block diagram showing an example of a structure of the fixed-point type wavelet reverse conversion section 9 shown in FIG. 13.

FIG. 14 shows a structural example of the fixed-point type wavelet reverse conversion section 9 and is comprised of a wavelet reverse converter 13 and a bit-shifter 14. The difference between the integer precision and the fixed-point precision has already been described with reference to FIG. 3. A bit-shift to the left is carried out in the analysis side. In contrast, in the synthesis side of the present embodiment, a bit-shift to the right is carried out, and operation for returning the value to the original level is carried out. In addition, a bit-shift is required only after a final decoded image (level 0) is obtained. That is, when an output 116 from the wavelet converter 13 is a conversion coefficient up to the level 1, the bit-shifter 14 is not passed through, but bit-shift processing is carried out by the bit-shifter 14 only when the output 116 from the wavelet reverse converter 13 becomes a final decoded image (level 0).

Note that the fixed-point type wavelet reverse conversion section and means of reverse conversion at the integer type wavelet conversion section has already been explained with reference to FIGS. 9 and 10. Therefore, explanation will be omitted from the present embodiment.

Ninth Embodiment

The ninth embodiment of the present invention presents a specific example of the wavelet reverse converter 13 shown in FIG. 14. This wavelet reverse converter 13 is comprised of a multiplier or a shift-calculator, an adder/subtracter, and a register. The hardware structure of this kind of wavelet reverse converter has already been explained with reference to FIGS. 11 and 12. Also, in the synthesis side, the wavelet reverse converter of the integer type wavelet reverse conversion section and the wavelet reverse converter of the fixed-point type wavelet reverse conversion type can have a common structure, as has already explained. Further, in the synthesis side, the calculation means does not differ between the fixed-point precision and the integer precision, as has already explained.

Tenth Embodiment

The tenth embodiment of the present invention relates to transmission/reception between the wavelet conversion section in the coding side and the wavelet reverse conversion section in the decoding side. The tenth embodiment comprises a means for detecting whether the integer type or the fixed type wavelet converter means has performed conversion from the coded bit stream in the decoding device, if a coded bit stream generated by a coding device comprising an integer type wavelet converter means and/or a fixed-point type wavelet converter means is decoded by a decoding device. If the integer type one has made conversion, a decoded image is outputted without performing gain adjustment on a high-band component coefficient or a bit-shift after reverse conversion. If the fixed-point type one has made conversion, a gain adjustment means for a high-band component and a bit-shift means after reverse conversion are used to output a decoded image by a means also comprised in the tenth embodiment.

Figure 15:
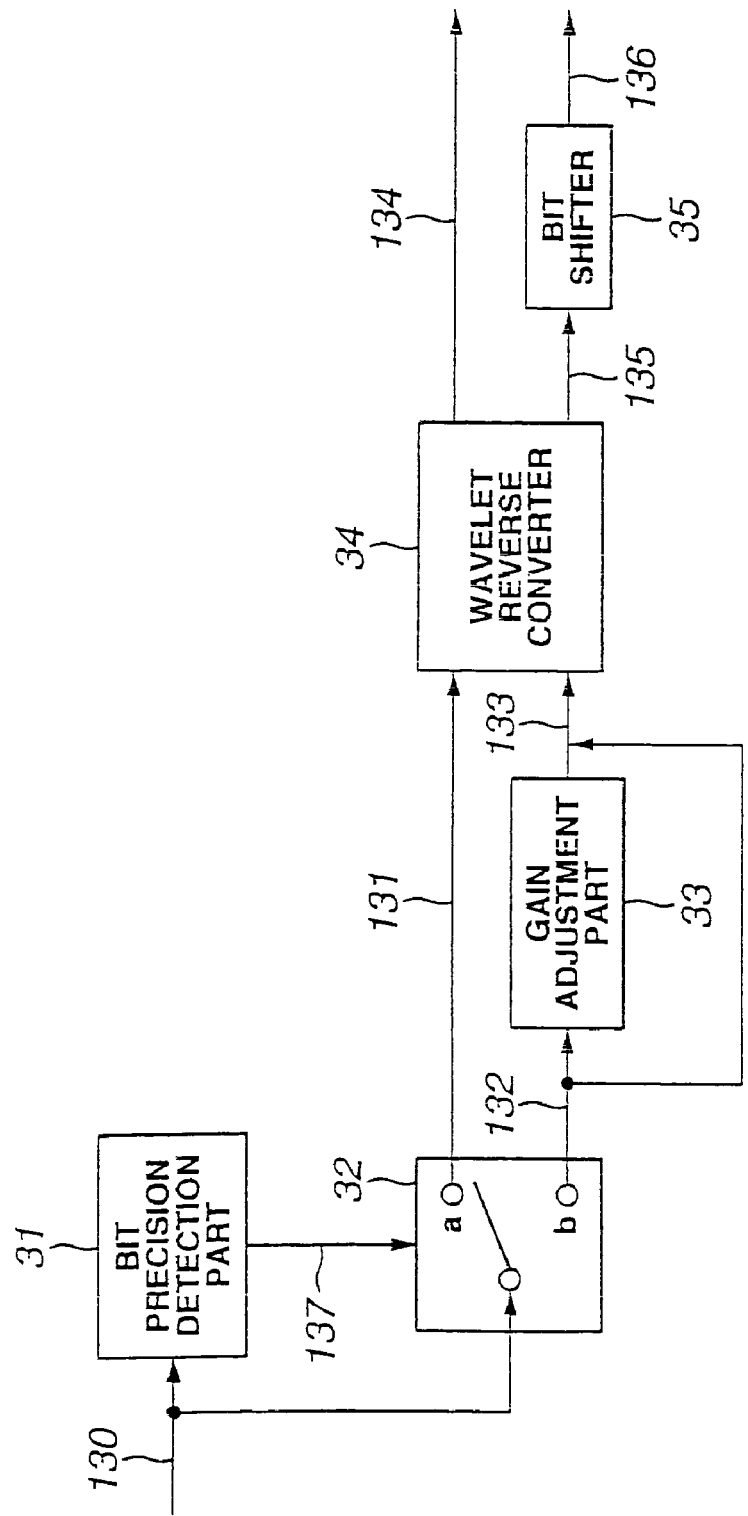
FIG. 15 is a block diagram showing another structural example of a wavelet reverse converter of an image decoding device.

FIG. 15 shows a schematic structure of a main part of the tenth embodiment, which is constructed by including a bit precision detector section 31, a switch 32, a gain adjustment section 33, a wavelet reverse converter 34, and a bit-shifter 35.

That is, in this FIG. 15, a bit precision detector section 31 which has received a coded bit stream 130 detects a code or information indicating a bit precision at which wavelet conversion has been performed in the wavelet converter of the coding device. Based on the detected information, a control signal 137 is sent from the bit precision detector section 31 to the switch 32.

At this time, if it is detected that the conversion has been performed at the integer precision, the switch 32 is switched and connected to the side of a selected terminal a. Alternatively, if it is detected that the conversion has been performed at the fixed-point precision, the switch 32 is switched and selected to the side of a selected terminal b. In the former case, a coded image 134 is outputted through the wavelet reverse converter 34.

On the other hand, in the latter case (fixed-point precision), gain adjustment processing is carried out by the gain adjustment section 33, with respect to a coefficient of a high-band component among conversion coefficients. Other low-band coefficients are directly passed to obtain an output 133. Next, this output 133 is subjected to reverse conversion by the wavelet reverse converter 34. With respect to a reverse conversion output 135, a final decoded image (level 0) is sent to the bit-shifter 35 and subjected to bit-shift to the right, so that a final decoded image 136 is obtained.

Eleventh Embodiment

The eleventh embodiment of the present invention shows an example of information used for performing the bit precision detection in the tenth embodiment described above. That is, in the tenth embodiment explained together with FIG. 15, a description has been made of a means comprising a means for detecting a code or information indicating the bit precision at which wavelet conversion has been carried out in the wavelet converter in the coding side. However, in practice, there must be a mechanism for incorporating the code or information into the coded bit stream 130.

FIG. 16 shows an example of information indicating the type of wavelet conversion or bit precision in a coding bit stream. The table shown in this FIG. 16 is prepared by newly adding a code of "0000 0010" (5-3 irreversible wavelet transform) to the table described as Table A-19 in FDC of JPEG-2000 Part-1. By this table, the integer precision type 5×3 filter explained in each of the above embodiments and the fixed-point precision type 5×3 filter can be identified.

That is, in FIG. 16, a code "0000 0010" of 5-3 irreversible wavelet transform (fixed-point precision type 5×3 filter) is added as a type of wavelet conversion (Transform Type), in addition to 9-7 irreversible wavelet transform (floating point precision type 9×7 filter) of a 8-bit code "0000 0000" and 5-3 reversible wavelet transform (integer precision type 5×3 filter) of "0000 0001". The 8-bit code expressing the type of wavelet conversion is detected and identified by the bit-precision detector section 31 shown in FIG. 15, and thus, signal processing or wavelet reverse conversion processing as described above, which are matched with the bit precision from the switch 32, can be performed.

Twelfth Embodiment

The twelfth embodiment of the present invention is constructed by comprising a means for pausing all decoding operation to set a decoding-impossible state or for issuing an indication of the decoding-impossible state to the outside when an input of a coded bit stream on which wavelet conversion has been performed with fixed-point precision is detected when it is the case of a decoding device provided only with an integer precision type wavelet reverse conversion means or a wavelet reverse conversion device.

That is, if a gain adjustment means for a high-band component coefficient and a bit-shift means used after reverse conversion are previously provided, as has been explained in the above tenth embodiment, reverse conversion and decoding can be performed correctly. If these means are not included, as in the present embodiment, all decoding operation is paused and the state is rendered decoding-impossible or an indication of a decoding-impossible state should be issued to the outside.

The first to twelfth embodiments explained above have a subject manner of solving problems in supply of high-quality coded images with respect to not only still images but also motion pictures, from the viewpoint of wavelet conversion means. That is, the fixed-point 5×3 filter as a fixed-point precision version of Integer 5×3 filter defined in FCD (Final Committee Draft) of JPEG-2000 Part-1 described above is not inferior to the float 7×9 filter also defined in FDC, with respect to coding efficiency, but has many parts in its internal calculator, which are common to the integer 5×3 filter. Accordingly, increase of hardware components is reduced to the minimum without sacrificing the coding efficiency, by arranging circuits or calculation means of both circuits to be common to each other. Also, in the embodiments of the present invention, for example, the integer 5×3 filter in JPEG-2000 and the fixed-point 5×3 filter are realized by a common structure. Needless to say, the present invention is applicable to other definitions than JPEG-2000.

A structure of the embodiments of the present invention comprises a means for reading such a portion of input images that is necessary for wavelet conversion and buffering it, a wavelet conversion means with fixed-point precision, and a wavelet conversion means with integer precision. The wavelet conversion means with the fixed-point precision further comprises a wavelet converter which can be common to the wavelet conversion means with the integer precision, and a bit-shifter. The wavelet converter which can be common is constructed by further including a multiplier or a shift-calculator, an adder/subtracter, and a register.

According to the embodiments of the present invention constructed in the structures as described above, there is an advantage in that increase of the entire hardware structure can be restricted by realizing the fixed-point type wavelet conversion means and the integer precision type wavelet conversion means, in form of a common structure. Also, selection between both means is controlled in correspondence with the image quality or compression rate, and it is therefore possible to realize constantly optimal wavelet conversion. Accordingly, since a mobile terminal such as a portable phone, PDA, or the like needs image transmission at a low bit-rate using a narrow band channel, there is an advantage that the mobile terminal can operate for a long time without sacrificing the compression rate, if the integer precision type wavelet conversion means is used which is excellent in the point of saving the power consumption.

The present invention is not limited to the above embodiments. For example, the number of taps of the filter of wavelet conversion is not limited to 5 3, and applicable standards are not limited to JPEG-2000.

What is claimed is:

1. An image decoding device into which a coded bit stream generated by a coding device comprising integer type wavelet conversion means and/or fixed-point type wavelet conversion means is inputted, the image decoding device comprising:

wavelet reverse conversion means;

gain adjustment means for a high-band component coefficient;

a bit-shifter; and means for detecting whether wavelet conversion performed by the coding device is of an integer type or a fixed-point type, from the inputted coded bit stream, wherein if the wavelet conversion is of the integer type, a decoded image is outputted without performing gain adjustment of the high-band component coefficient or a bit shift after the wavelet reverse conversion, or if the wavelet conversion is of the fixed-point type, the gain adjustment of the high-band component coefficient and the bit shift after the wavelet reverse conversion are carried out, to output a decoded image.

2. An image decoding method in which a coded bit stream generated by a coding device comprising integer type wavelet conversion means and/or fixed-point type wavelet conversion means is inputted and wavelet reverse conversion is performed, comprising the steps of:

detecting whether wavelet conversion performed by the coding device is of an integer type or a fixed-point type, from the inputted coded bit stream; and outputting a decoded image without performing gain adjustment of a high-band component coefficient or a bit shift after wavelet reverse conversion when the wavelet conversion is detected to be of the integer type by the detecting step, or performing the gain adjustment of the high-band component coefficient and the bit shift after the wavelet reverse conversion to output a decoded image, when the wavelet conversion is detected to be of the fixed-point type by the detecting step.

* * * * *